United States Patent
Tomishima et al.

(10) Patent No.: US 7,024,201 B2
(45) Date of Patent: Apr. 4, 2006

(54) MOBILE COMMUNICATION SYSTEM (75) Inventors: Hiroyuki Tomishima, Tokyo (JP);
Hirofumi Shiotsuki, Tokyo (JP)

(73) Assignee: NEC Corporation, Tokyo (JP)

( * ) Notice: Subject to any disclaimer, the term of this patent is extended or adjusted under 35 U.S.C. 154(b) by 489 days.

(21) Appl. No.: 10/316,838

(22) Filed: Dec. 12, 2002

(65) Prior Publication Data
US 2003/0119516 A1    Jun. 26, 2003

(30) Foreign Application Priority Data
Dec. 21, 2001    (JP) .............................. 2001-388928

(51) Int. Cl.
*H04Q 7/20*    (2006.01)

(52) U.S. Cl. .................. 455/452.2; 455/403; 370/235; 370/252; 370/253

(58) Field of Classification Search ............. 455/67.11, 455/67.14, 423, 445, 452.1, 452.2, 403, 560; 370/235, 236, 252, 395.5, 394, 468, 465, 370/232, 233, 234, 236.2; 709/229, 408
See application file for complete search history.

(56) References Cited

U.S. PATENT DOCUMENTS

| 5,487,072 A | 1/1996 | Kant |
| 5,563,874 A | 10/1996 | Kant |
| 5,995,239 A | 11/1999 | Kagawa et al. |
| 6,832,082 B1 * | 12/2004 | Ramaswamy et al. ...... 455/411 |
| 2002/0034947 A1 * | 3/2002 | Soliman ..................... 455/436 |
| 2002/0080719 A1 | 6/2002 | Parkvall et al. |

FOREIGN PATENT DOCUMENTS

| JP | 10-042120 | 2/1998 |
| JP | 10-117213 | 5/1999 |

* cited by examiner

*Primary Examiner*—Jean Gelin
(74) *Attorney, Agent, or Firm*—Foley & Lardner LLP (57) ABSTRACT By detecting a degraded state of wireless transmission quality due to steady occurrence of re-transmission in an early stage to lead to a call connection, a service quality is made sure, an excess time charge on an end user is prevented and wireless resources are utilized efficiently. A base station controller monitors a PDU transmission state in a wireless link to a mobile station in call unit, calculates an occurrence rate of re-transmission as an evaluation value of wireless transmission quality, determines a degradation of the wireless transmission quality when the occurrence rate of re-transmission becomes equal to or larger than a predetermined threshold value and performs a disconnection processing for the call.

8 Claims, 13 Drawing Sheets

PDU Managing Table (state 1)

| PDU Identifier (a) | Communication State (b) | Number of Transmissions (c) |
|---|---|---|
| 1 | re-transmission state | 4 |
| 2 | re-transmission state | 3 |
| 3 | re-transmission state | 2 |
| ⋮ | ⋮ | ⋮ |
| P | re-transmission state | 2 |
| — | — | — |
| ⋮ | ⋮ | ⋮ |
| — | — | — |
| Total Number of Managed PDUs (d) | Total Number of Re-transmission States (e) | |
| P | q | |

Fig. 3

PDU Managing Table (state 2)

| PDU Identifier | Communication State | Number of Transmissions |
|---|---|---|
| 1 | re-transmission state | 4 |
| 2 | re-transmission state | 3 |
| 3 | re-transmission state | 2 |
| : | : | : |
| P | re-transmission state | 2 |
| P+1 | new transmission state | 1 |
| : | : | : |
| — | — | — |
| Total Number of Managed PDUs | Total Number of Re-transmission States | |
| P+1 | q | |

Fig. 4

PDU Managing Table (state 3)

| PDU Identifier | Communication State | Number of Transmissions |
|---|---|---|
| 1 | re-transmission state | 4 |
| 2 | re-transmission state | 3 |
| 3 | re-transmission state | 2 |
| : | : | : |
| P | re-transmission state | 3 |
| P+1 | new transmission state | 1 |
| : | : | : |
| — | — | — |
| Total Number of Managed PDUs | Total Number of Re-transmission States | |
| P+1 | q | |

Fig. 5

PDU Managing Table (state 4)

| PDU Identifier | Communication State | Number of Transmissions |
|---|---|---|
| 1 | re-transmission state | 4 |
| 2 | re-transmission state | 3 |
| 3 | re-transmission state | 2 |
| : | : | : |
| P | re-transmission state | 2 |
| P+1 | re-transmission state | 2 |
| : | : | : |
| — | — | — |
| Total Number of Managed PDUs | Total Number of Re-transmission States | |
| P+1 | q+1 | |

MOBILE COMMUNICATION SYSTEM

BACKGROUND OF THE INVENTION

1. Field of the Invention

The present invention relates to a mobile communication system in which a wireless link control is performed by processing an acknowledged mode wireless link control protocol.

2. Description of the Related Art

Figure 11:
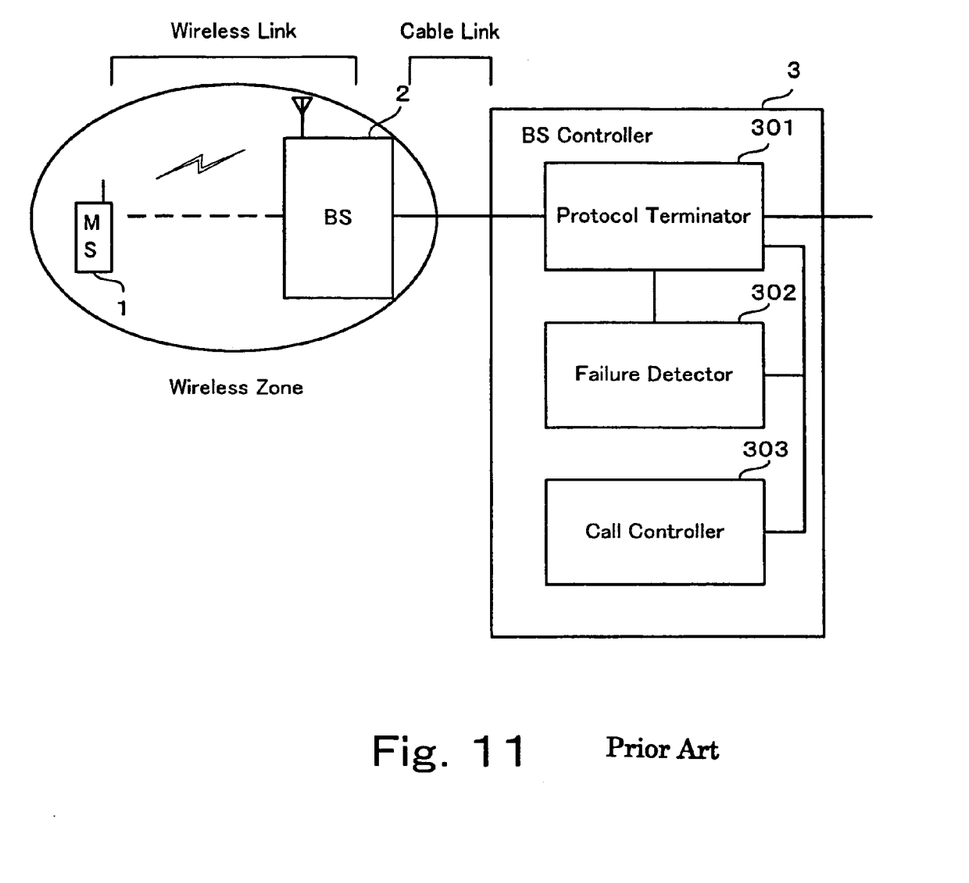
FIG. 11 is a basic construction of a conventional mobile communication system.

A prior art mobile communication system in which an acknowledged mode wireless link control protocol is processed will be described with reference to FIG. 11 showing a basic construction thereof. In this specification, the mobile communication system using CDMA (Code Division Multiple Access) system will be described. As shown in FIG. 11, the CDMA mobile communication system is constructed with a plurality of mobile stations 1, a plurality of base stations 2 each for connecting a plurality of mobile stations 1 within a wireless zone and base station controller 3 for controlling a plurality of base stations 2. Base station controller 3 and base stations 2 are connected through cable links and base station 2 and mobile stations 1 are connected through wireless links.

Base station controller 3 performs a wireless link control by processing an acknowledged mode wireless link control protocol with respect to mobile stations 1. The term "acknowledged mode" means an operation mode in which an acknowledge processing is performed by formatting a protocol data unit (PDU) on a wireless link to a signal format having acknowledge function and, when there is an error in transmitting the signal, such as signal drop, a re-transmission of the signal is performed.

Base station controller 3 includes protocol terminator 301 for performing a termination processing of the acknowledged mode wireless link control protocol, failure detector 302 for performing a predetermined failure detection processing related to the wireless link control in protocol terminator 301 and call controller 303 for controlling call connection/call disconnection.

In the case of the CDMA mobile communication system, mobile station 1 is capable of simultaneously having a plurality of wireless transmission links to a plurality of base stations 2 covered by base station controller 3. In the CDMA mobile communication system, when a wireless transmission quality in a certain one of the wireless transmission links is degraded, a processing (soft hand-over) for selecting another of the wireless transmission links having acceptable transmission quality and establishing a connection between the mobile station and the base station through the another wireless link is performed. With this scheme, the call connection service for always providing an optimal wireless transmission link is performed.

Figure 12:
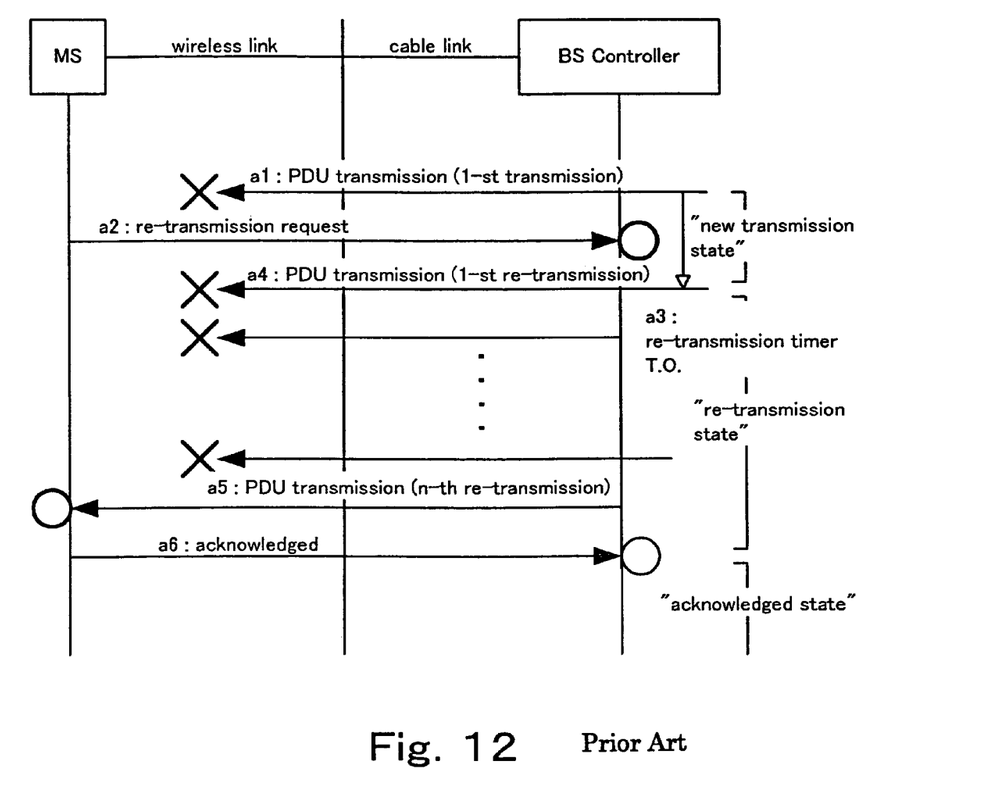
FIG. 12 shows a conventional re-transmission sequence.

FIG. 12 shows a usual re-transmission sequence of an arbitrary PDU in a case where, during an original transmission (a1, number of transmissions=1) of PDU from base station controller 3 through base station 2 to mobile station 1, the PDU is dropped in a wireless link thereof. In such case, a re-transmission (a4, number of re-transmissions=1, number of transmissions=2) of the PDU is performed upon a reception of a re-transmission request (a2, negative acknowledge) from mobile station 1 by PDU base station controller 3 or a time-out (a3) of a re-transmission timer in base station controller 3.

Base station controller 3 recognizes the state of the PDU (transmission state) from a start of the 1st transmission (a1) to a start of the re-transmission (a4) as a "new transmission state" and the state subsequent to the start of the re-transmission (a4) as a "re-transmission state". It is assumed thereafter that, due to transmission error of PDU, the re-transmission is repeated and the PDU transmission to mobile station 1 is completed by n-th re-transmission a5 (number of re-transmissions=n, number of transmissions=(n+1)). In response thereto, mobile station 1 transmits a PDU reception acknowledge (positive acknowledge) a6 to base station controller 3. In response to the acknowledge a6, base station controller 3 confirms a success of the transmission of PDU to mobile station 1 and decides that "re-transmission state" is completed. Base station controller 3 recognizes a state after the receiving time of the acknowledge a6 as a "acknowledged state". In summary, an arbitrary PDU in base station controller 3 can be in "new transmission state", "re-transmission state" or "acknowledged state".

When the wireless transmission state of the wireless link between protocol terminator 301 of base station controller 3 and mobile station 1 is unacceptable, the transmission error such as signal drop may occur. In general, when there is a PDU undelivered due to transmission error in the acknowledged mode wireless link control protocol, the re-transmission processing is executed repeatedly until a delivery thereof is confirmed. When the re-transmission is repeated, the call disconnection processing is performed provided that the delivery of PDU can not be confirmed even when the number of re-transmissions reaches the maximum number predetermined in the system.

However, in a practical use of the system, there is mobile station 1 whose wireless transmission state is not acceptable in a wireless transmission link to any base station 2, depending upon a positional relation between a wireless service area (wireless zone or cell) and mobile station 1. For such call, there is a state where, although re-transmission of a PDU occurs steadily in the acknowledged mode wireless link control between base station 2 and mobile station 1, the number of re-transmissions of the PDU never reaches the above mentioned maximum number. Since, in such state, the maximum number of re-transmissions is not reached though the end-to-end through-put is kept degraded (degradation of service quality) due to steadily occurring re-transmission, the call is not disconnected and the call connection is maintained.

Since the re-transmission processing in the acknowledged mode wireless link control protocol is frequently performed for such call which continuously exists regardless of lowered transmission quality thereof in the wireless zone due to steadily occurring re-transmission, there is a problem that through-put related to data of an upper layer is kept low. In such state, service quality expected by an end user or to be provided by the system is degraded. Further, there is a problem that an amount of time charge charged on the end user who utilizes such call is increased since, when the end user transmits a constant amount of data, a required communication time or an amount of communication data is increased for the reasons mentioned above.

Figure 13:
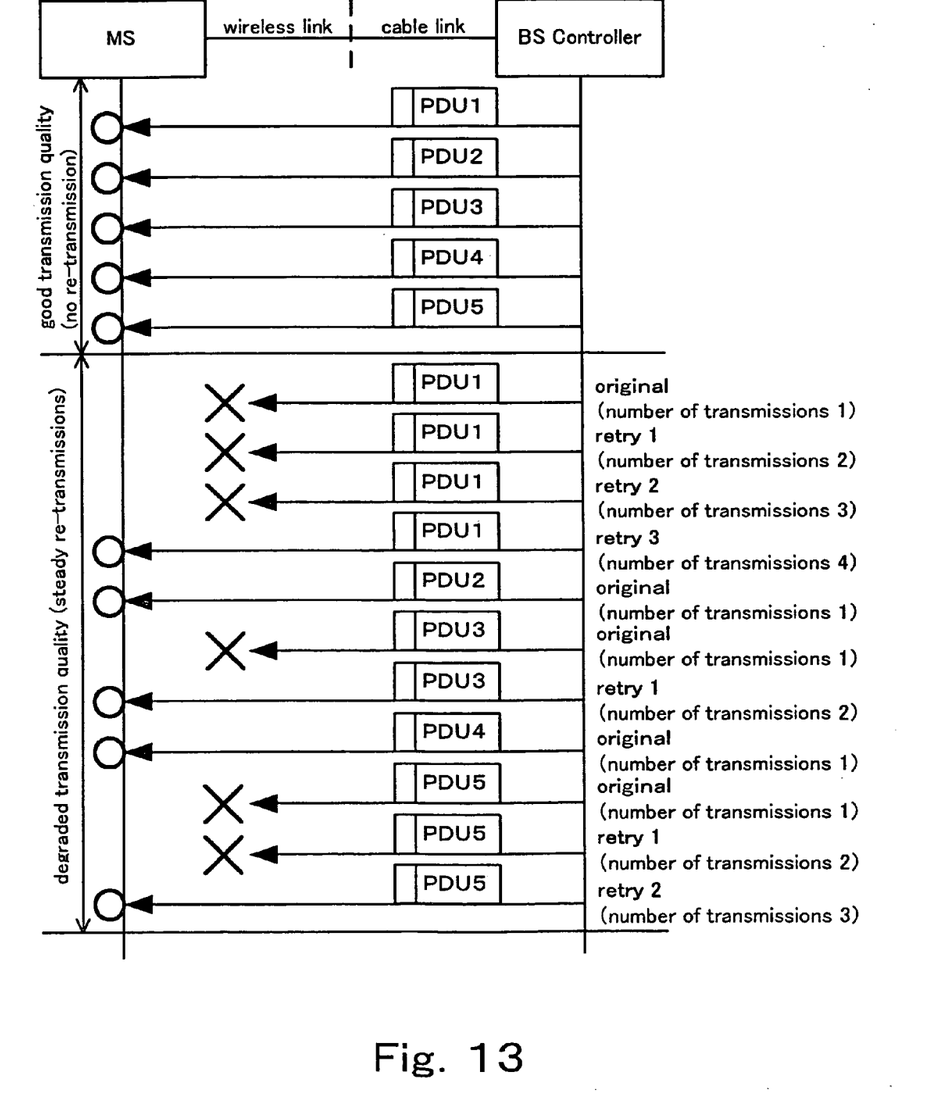
FIG. 13 shows an example of a case where wireless transmission quality is acceptable and a case where it is degraded due to steady occurrence of re-transmission.

FIG. 13 shows a case where the wireless transmission quality of the wireless link is acceptable and a case where the quality is degraded due to steadily occurring re-transmission. In the wireless link between mobile station 1 and base station 2, a PDU, which is a transmission signal, is transmitted from base station 2 to mobile station 1. PDUs are distinguished from each other by attaching different numbers thereto. Incidentally, acknowledge signals from mobile station 1 are not shown. An upper portion of FIG. 13 shows a transmission sequence through a wireless link having acceptable transmission quality and PDUs 1 to 5 are delivered without re-transmission caused by transmission error.

A lower portion of FIG. 13 shows a transmission sequence when the transmission quality of the wireless link is lowered due to steadily occurring re-transmissions. Describing PDU1, for example, an initial transmission (original) is failed and a re-transmission (retry 1) is executed. Two re-transmissions (retry 1 and retry 2) are failed and the delivery of PDU1 is achieved by a third re-transmission (retry 3). Since the number of failed re-transmissions is smaller than the maximum number of re-transmissions (larger than 2 in this case), the call is not disconnected.

As is clear from FIG. 13, a time required to deliver a unit amount of data when the wireless transmission quality is degraded due to steady re-transmission becomes longer than that when the wireless transmission quality is high. Since the end-to-end data is carried on a payload portion of the PDU, the throughput is lowered in proportion to frequency of occurrence of re-transmission.

SUMMARY OF THE INVENTION

The present invention was made in view of the above mentioned problem and has an object to provide a mobile communication system capable of maintaining service quality, preventing excess time charge on an end user due to increase of required communication time or communication data from occurring and effectively utilizing wireless resources by detecting in an early stage a degradation of wireless transmission quality due to steadily occurring re-transmission and disconnecting a related call.

In order to achieve the above mentioned object, a mobile communication system in which a base station controller performs an acknowledged mode wireless link control protocol with respect to a mobile station, according to a first aspect of the present invention, is featured by that the base station controller monitors a PDU transmission state in call unit in a wireless link between the base station controller and the mobile station, calculates an occurrence rate of re-transmission of data as an evaluation value of radio transmission quality and, when the occurrence rate of re-transmission becomes equal to or larger than a threshold value, determines a degraded wireless transmission quality and disconnects the call.

The base station controller preferably comprises protocol terminating means for performing a terminating processing of an acknowledged mode wireless link control protocol in a wireless link between the base station and the mobile station, failure detection means for monitoring a PDU transmission state in call unit in a wireless link between the base station controller and the mobile station, calculating an occurrence rate of re-transmission of data as an evaluation value of wireless transmission quality and, when the occurrence rate of re-transmission becomes equal to or larger than a predetermined threshold value, deciding a degraded state of the radio transmission quality and reporting it and call control means for performing a call disconnection on the basis of the decision of the degraded state.

The occurrence rate of re-transmission can be calculated by the following formula:

[total number of re-transmission states(number of PDUs among PDUs under management, in re-transmission state)]/[total number of PDUs under management]

Alternatively, the occurrence rate of re-transmission can be calculated by the following formula:

[total number of re-transmission states(number of PDUs among PDUs under management, in re-transmission state)]/[PDU transmission window size]

The mobile communication may further comprises a maintenance terminal connected to the base station controller, for setting the threshold value of the occurrence rate of re-transmission and receiving the report of the degraded state of the wireless transmission quality.

According to a second aspect of the present invention, a mobile communication system in which a base station controller performs an acknowledged mode wireless link control protocol with respect to a mobile station is featured by that the base station controller monitors a PDU transmission state of every base station in a wireless link in unit of all calls covering base stations in a covering zone of the base station controller, calculates a total number of re-transmission states for each call as an evaluation value of wireless transmission quality and, when the total number becomes equal to or larger than a predetermined threshold value, decides the call as a quasi-degraded state and calculates a rate of quasi-degraded calls to all calls of the base stations in the covering zone and, when the call rate becomes equal to or larger than a predetermined threshold value, decides a quasi-degraded state in unit of all calls of base stations in the covering zone and performs a reporting processing of it.

The mobile communication system may further comprise a maintenance terminal connected to the base station controller, for setting the threshold values and receiving the report of the quasi-degraded state of wireless transmission quality.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Embodiments of the present invention will be described in detail with reference to the drawings. The mobile communication system of the present invention, which has a base station controller for performing a processing of an acknowledged mode wireless link control protocol for a call between it and a mobile station, evaluates a wireless transmission quality of a wireless link between the mobile station and the base station controller on the basis of such as occurrence rate of re-transmission of data, determines whether or not the wireless transmission quality is degraded according to an evaluated value and, when it is determined that the wireless transmission quality is degraded, performs a processing to disconnect (open) the call.

Thus, it is possible to not allow a state where the end-to-end throughput is lowered (service quality is lowered) for a call whose acceptable wireless transmission quality can not be maintained even when an optimal connection between a base station controller and a mobile station is provided continuously to thereby prevent an excessive time charge on an end user. Further, an effective utilization of wireless resources (increase of multiplication number of signals in a case of CDMA system) is realized in a wireless transmission section of the system by excluding calls whose wireless transmission quality is degraded.

Figure 1:
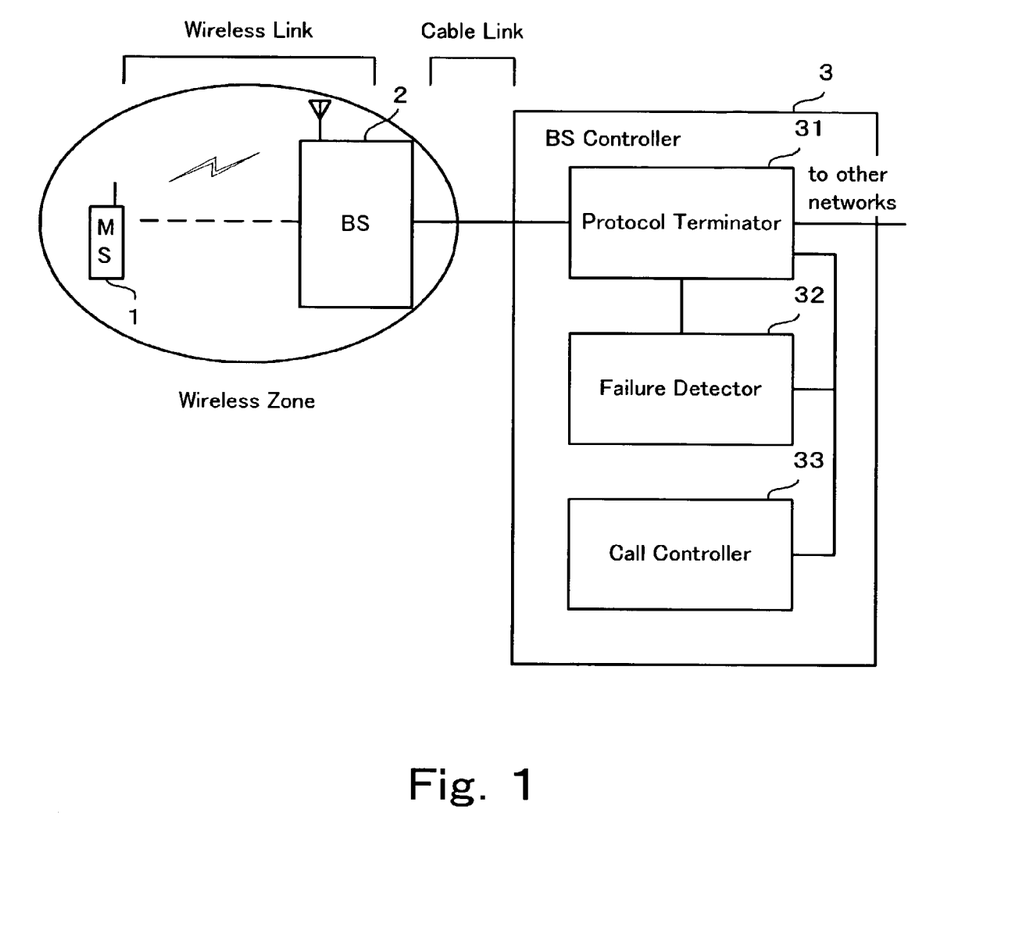
FIG. 1 shows a construction of a mobile communication system according to a first embodiment of the present invention.

FIG. 1 shows a construction of a mobile communication system according to a first embodiment of the present invention. In FIG. 1, the mobile communication system is constructed with mobile station 1, base station 2 and base station controller 3. Base station controller 3 can be connected to other networks through such as switching networks which are not shown. Mobile station 1 is connected to base station 2 through a wireless link and base station 2 is connected to base station controller 3 through a cable link. Base station controller 3 performs a wireless link control by processing an acknowledged mode wireless link control protocol between it and mobile station 1.

Base station controller 3 includes protocol terminator 31, failure detector 32 and call controller 33. Protocol terminator 31 performs a termination processing of the acknowledged mode wireless link control protocol. Failure detector 32 monitors a transmission state of a PDU for a wireless link control processing in protocol terminator 31 and performs a detection processing of degradation of the wireless transmission quality. The term "degraded state of transmission quality" means a state where the end-to-end throughput in a wireless link is degraded due to steadily occurring re-transmission as pointed out in the prior art description. Failure detector 32 calculates an evaluation value by evaluating the wireless transmission quality of the radio link according to the present invention and determines on the basis of the evaluation value whether or not the wireless transmission quality is degraded. The monitoring method and the evaluation method will be described in detail later. Call controller 33 performs a call control throughout base station controller 3 and controls a disconnection (open) of call on the basis of the detection of the degradation of wireless transmission quality by failure detector 32.

Protocol terminator 31, failure detector 32 and call controller 33 are constructed with CPUs, software operable by the CPUs, memories storing the software or hardware dedicated to the protocol control, etc., respectively.

Figure 2:
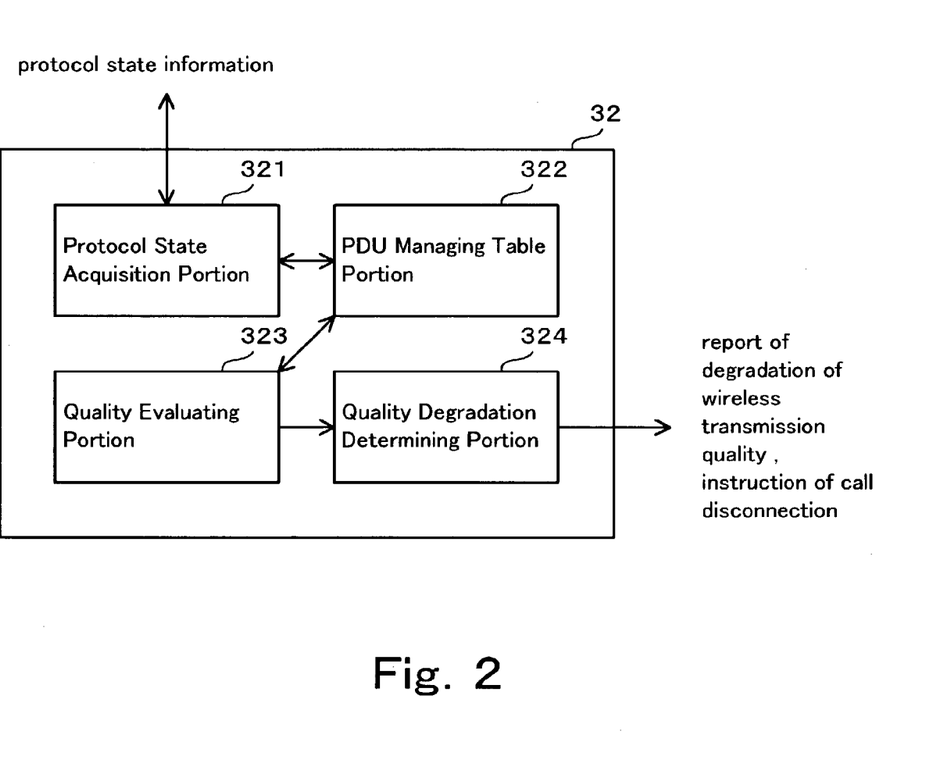
FIG. 2 is a block diagram of failure detector 32 shown in FIG. 1.

Failure detector 32 further includes protocol state acquisition portion 321, PDU managing table portion 322, wireless transmission quality evaluating portion 323 and wireless transmission quality degradation determining portion 324, etc., as a constructive module.

Protocol state acquisition portion 321 performs a processing for acquiring a protocol state information from protocol terminator 31. The protocol state information includes a transmission state information of a PDU. PDU managing table portion 322 manages a PDU managing table T. Failure detector 32 has a memory region therefor. The PDU managing table T is prepared for every call to manage a transmission PDU information for the call. Wireless transmission quality evaluating portion 323 performs an evaluation processing of transmission quality of a wireless link for a certain call. Wireless transmission quality degradation determining portion 324 determines on the basis of an evaluation value calculated by the evaluation processing whether or not the wireless transmission quality is degraded and performs a processing for reporting the degraded state to the call controller.

Figure 7:
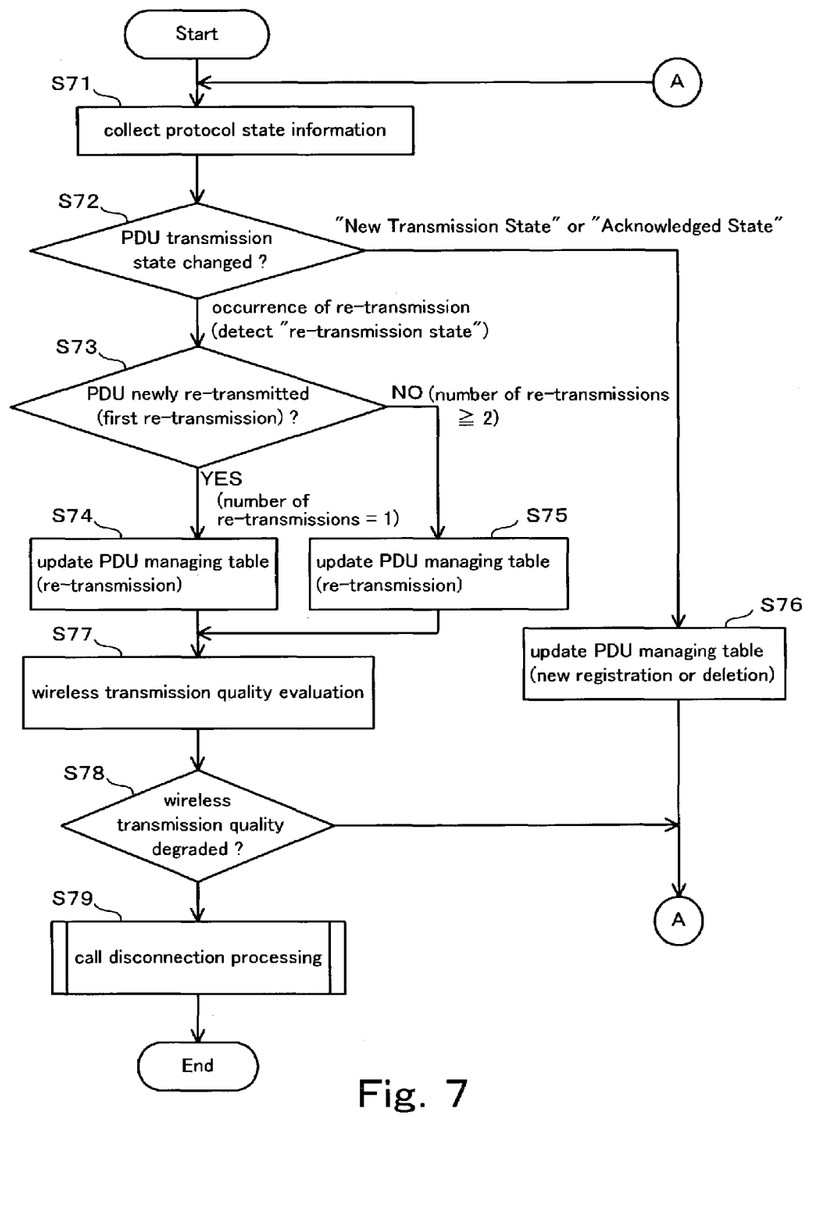
FIG. 7 is a flowchart of a wireless transmission quality monitoring processing and a degraded state detection processing in the mobile communication system according to the first embodiment of the present invention.

FIG. 7 is a flowchart related to the wireless transmission quality monitoring processing and the degradation detecting processing in failure detector 32 of base station controller 3. The processing in the present invention will be described with reference to FIG. 7. First, in step S71, failure detector 32 acquires the protocol state information from protocol terminator 31. The protocol state information includes a transmission state information of a PDU. Failure detector 32 recognizes a change of the transmission state of each of the PDUs on the basis of the protocol state information. The acquisition of the protocol state information may be performed by checking protocol terminator 31 by failure detector 32 or may be performed by reporting the information to failure detector 32 by protocol terminator 31. Failure detector 31 acquires "new transmission state", "re-transmission state" and "acknowledged state", etc., as the transmission state information of PDU.

Figure 3:
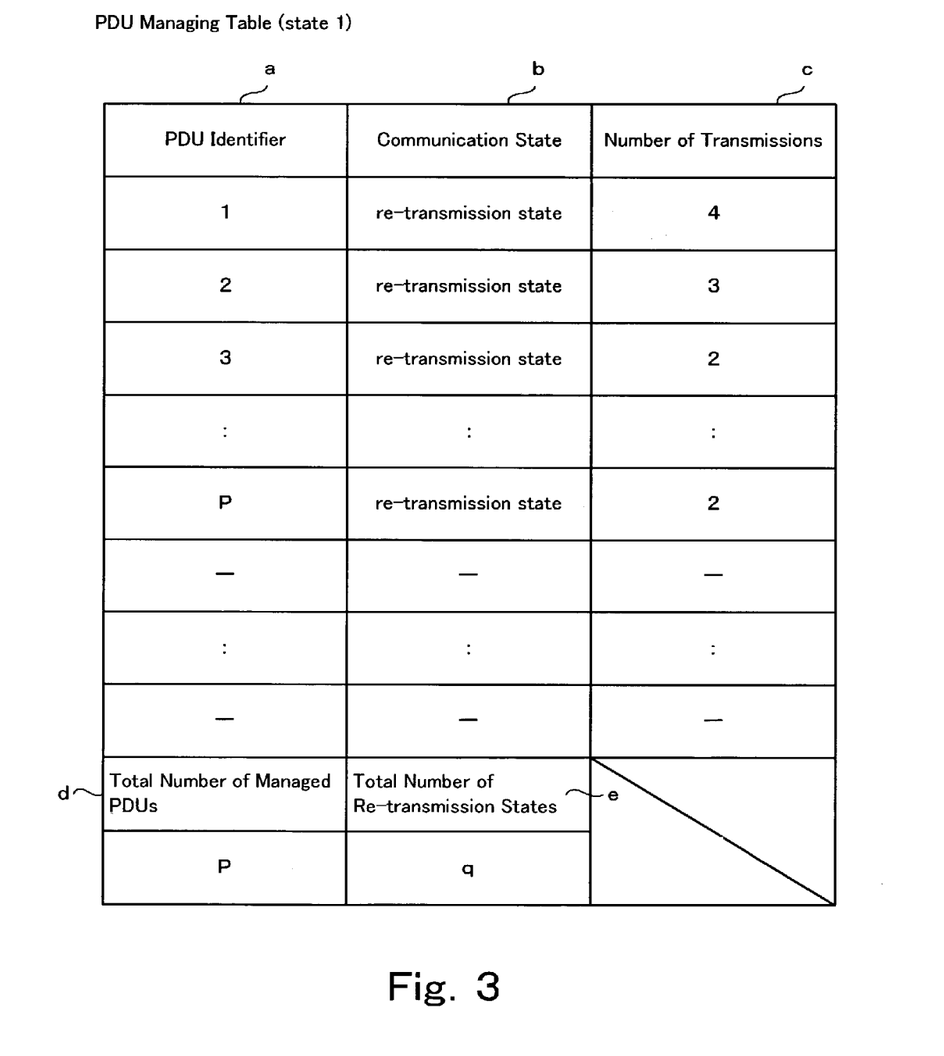
FIG. 3 shows a construction of a PDU management table (state 1)

Failure detector 32 recognizes the transmission state of the respective PDUs on the basis of the protocol state information acquired from protocol terminator 31 and produces/updates PDU managing table T for each call as shown in FIG. 3. PDU managing table T is stored in the memory equipped in failure detector 32.

PDU managing table T includes records of PDUs under transmission processing and each of the PDU records has attributes of PDU identifier (a), transmission state (b) and transmission number (c), etc. Further, PDU managing table T has attributes of total number (d) of PDUs managed and total number (e) of re-transmission states, etc. The PDU identifier (a) is allocated to each of the PDUs. The PDU identifier (a) may be a sequence number attached to the PDU or a number, which is managed in protocol terminator 31 and assigned to the PDU. The transmission state (b) shows a transmission state of PDU in protocol terminator 31 and has a value of "new transmission state", "re-transmission state" or "acknowledged state", as mentioned in the prior art description. The number (c) of transmissions is a total number of transmissions of each PDU and is, for example, 1 in the new transmission state and 2 in a first re-transmission. The total number (d) of PDUs managed indicates the number of PDUs under transmission processing for one call. The total number (e) of re-transmission states indicates the number of PDUs among the PDUs managed for the call, which are in "re-transmission state". These elements are updated at any time when the processing state in protocol terminator 31 is changed.

Figure 4:
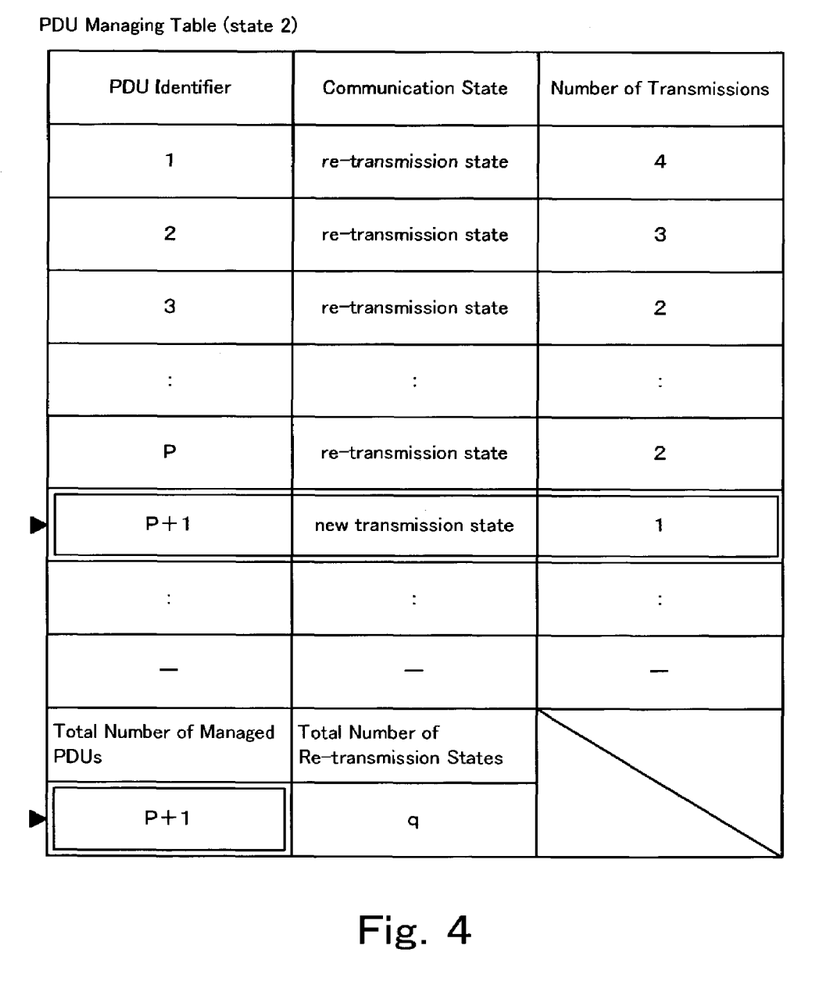
FIG. 4 shows a construction of a PDU management table (state 2)

In step S72, failure detector 32 recognizes the change of the transmission state of PDU on the basis of the protocol state information. In step S76, when "new transmission state" is acquired as the change of transmission state of PDU, a record of the PDU, which becomes the new transmission state, is additionally registered in PDU managing table T, an identifier (a) of the PDU in PDU managing table T is set, the transmission state (b) in PDU managing table T is set to "new transmission state" and the number (c) of transmissions in the same table is set to 1(time). With these settings, the total number (d) of PDUs managed is incremented by 1. With this processing, PDU managing table T shown in FIG. 3 is updated to that shown in FIG. 4. In FIG. 4, the record having the PDU identifier "p+1" corresponds to the newly registered PDU.

Further, when failure detector 32 acquires "acknowledged state" as the change of PDU transmission state in step S72, failure detector 32 deletes the record of the corresponding PDU in PDU managing table T in step S76. Simultaneously therewith, the total number (d) of the managed PDUs is decreased by 1 and further the total number (e) of re-transmission states is decreased by 1 when the state of the same PDU was the "re-transmission state" before it is acknowledged. This processing corresponds to the change of table T from that shown in FIG. 4 to that shown in FIG. 3 and the record of the PDU having PDU identifier "p+1" shown in FIG. 4 corresponds to the deleted PDU.

On the contrary, when failure detector 32 acquires an occurrence of re-transmission (detects "re-transmission state") as the change of PDU transmission state in step S72, it determines in step S73 whether or not the same PDU is a new re-transmission PDU, that is, a PDU in first re-transmission state. In detail, when the field of the transmission state (b) of the same PDU is "new transmission state" in PDU managing table T (in this case, shown in FIG. 4), failure detector 32 determines that the same PDU is a new re-transmitted PDU (YES in step S73) and, when the transmission state (b) is already "re-transmission state", the same PDU is determined as a second or subsequent re-transmission PDU (NO in step S73).

Incidentally, it may be possible to perform the determination by using the information of not the transmission state (b) but the number (c) of transmissions. Alternatively, the protocol state information may include the number (c) of transmission. Further, "new re-transmission state" (the number of transmissions is 2) may be provided as the transmission state value. In any case, protocol state acquisition portion 321 and PDU managing table portion 322 of failure detector 32 get hold of an information of at least the transmission state and the number of transmissions of PDU.

Figure 5:
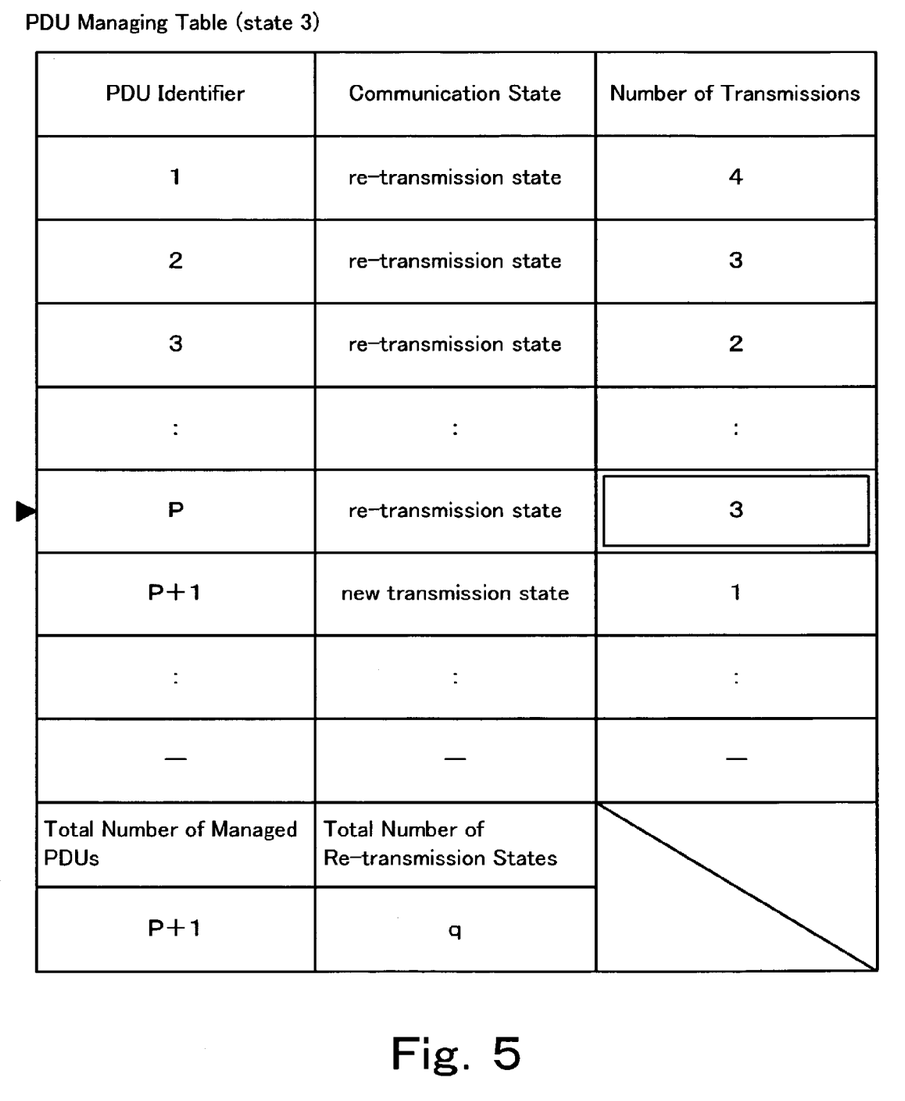
FIG. 5 shows a construction of a PDU management table (state 3)
Figure 6:
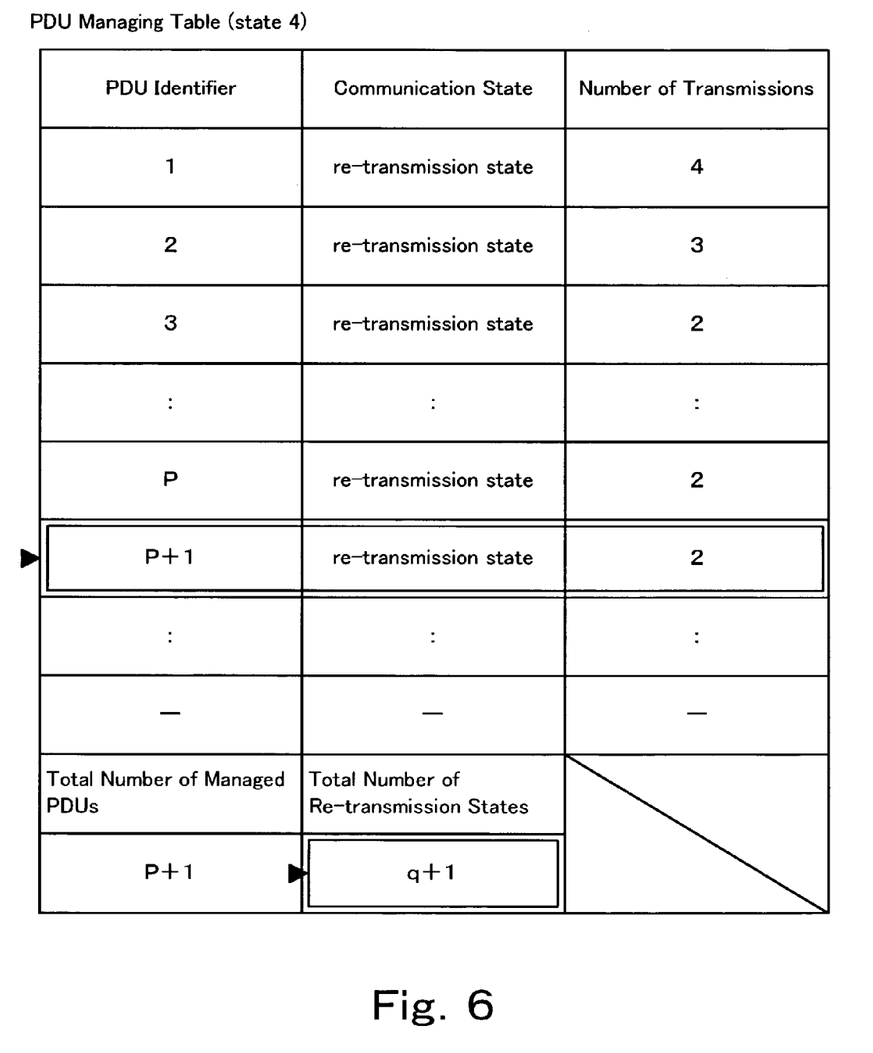
FIG. 6 shows a construction of a PDU management table (state 4)

When the PDU is determined as a PDU not under new re-transmission but under a second or subsequent re-transmission in step S73, the number (c) of transmissions in the record of the same PDU in PDU managing table T shown in FIG. 3 is incremented by 1 (changed to the record of the PDU having PDU identifier "p" shown in FIG. 5) in step S75. When the PDU is determined as a new re-transmission (first re-transmission), the transmission state (b) of the record of the same PDU in PDU managing table T is updated from "new transmission state" to "re-transmission state" and the number (c) of transmissions is incremented by 1 (the number of transmissions is changed from 1 to 2) in step S74. Simultaneously therewith, the total number (e) of re-transmission states is incremented by 1 (change of the record of PDU having PDU identifier "p+1" and change of the total number of re-transmission states to "q+1" in FIG. 6).

Since the total number (e) of re-transmission states is incremented by 1 after step S74 or S75, the evaluation processing of wireless transmission quality for the call is performed in step S77. And then, it is determined on the basis of the calculated evaluation value whether or not the wireless transmission quality is degraded in step S78.

In the first embodiment, the wireless transmission quality is evaluated according to the following equation (1):

$$[\text{re-transmission occurrence rate } (r)] = [\text{total number of re-transmissions } (q)]/[\text{total number of managed PDUs } (p)] \quad (1)$$

The occurrence rate (r) indicates a ratio of PDUs in "re-transmission state" to the managed PDUs for a certain call.

Wireless transmission quality evaluating portion 323 of failure detector 32 calculates, as the evaluation value of the wireless transmission quality, the re-transmission occurrence rate (r) while referencing PDU managing table T. Wireless transmission quality degradation determining portion 324 compares the occurrence rate (r) with a predetermined threshold value (rt) of the re-transmission occurrence rate in step S78. When the re-transmission occurrence rate (r) is equal to or larger than the threshold value (rt) ([re-transmission occurrence rate (r)]≧[re-transmission occurrence rate threshold value (rt)]), it determines that the wireless transmission quality is in "degraded state" (YES in step S78).

Failure detector 32 reports call controller 33 of the degraded state of the wireless transmission quality in step S79. Call controller 33 instructs a disconnection of the same call registered in protocol terminator 31 to perform a call disconnection (open) processing. When (r) is smaller than (rt) in step S78, the call connection is maintained (NO in step S78).

In a case where the wireless link control protocol is conscious of the transmission window of PDU, the wireless transmission quality may be evaluated according to the following equation (2) instead of the previously mentioned equation (1):

$$[\text{re-transmission occurrence rate } (r)] = [\text{total number of re-transmissions } (q)]/[\text{PDU transmission window size}] \quad (2)$$

The occurrence rate (r) of re-transmission is calculated by a CPU provided in failure detector 32 and a software operated by the CPU and the threshold value (rt) of the occurrence rate of re-transmission, which is a determining condition for detecting degradation of wireless transmission quality, is set in a software provided in failure detector 32 and stored in a memory thereof.

Figure 8:
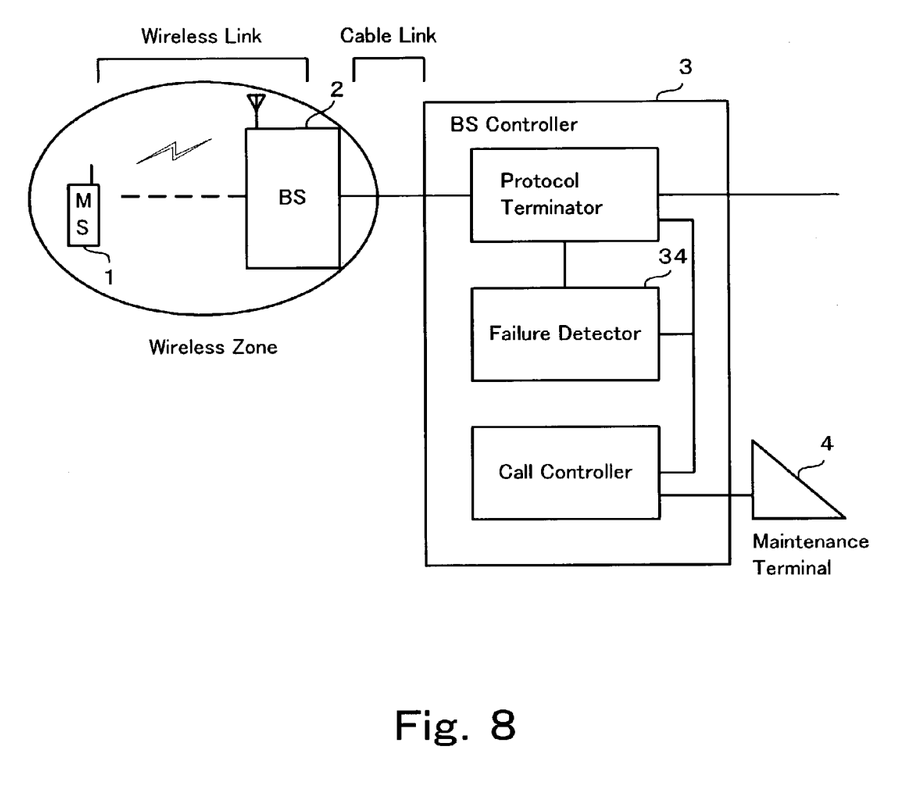
FIG. 8 shows a construction of the mobile communication system of the first embodiment, with a maintenance terminal attached thereto.

The threshold value (rt) of the occurrence rate of re-transmission is not always a fixed value. For example, the threshold value may be freely rewritten by a system manager through an external maintenance terminal of base station controller 3. A construction therefor is shown in FIG. 8. In FIG. 8, call controller 33 is connected to external maintenance terminal 4 through predetermined communication means. Thus, the control performed by the present invention can be outputted to external maintenance terminal 4. Therefore, the system manager can set various values including the threshold value (rt) of occurrence rate of re-transmission from maintenance terminal 4.

Now, a second embodiment of the present invention will be described. In the first embodiment, the monitoring of transmission state of PDU is performed for every call and the call disconnection is performed by detecting the degradation of wireless transmission quality. In the second embodiment, however, the monitoring of transmission state of PDU and the evaluation thereof are performed for not every call but all calls covered by base station 2 as a unit. Although it is impossible to perform a call disconnection by monitoring and evaluating every call and detecting a degradation of transmission quality of the call, according to the second embodiment, it is possible to detect a state where transmission quality in an area covered by base station 2 is totally being degraded, by monitoring the total number of re-transmissions for all of the calls of base station 2.

In the mobile communication system according to the second embodiment, "quasi degradation of wireless transmission quality" is detected for all calls covered by base station 2 as a unit. The term "quasi degradation of radio transmission quality" means a state where the state of transmission quality is not the "degraded state" in the first embodiment but a state where calls in the area covered by base station 2 are totally being degraded. Failure detector 34 performs a processing for detecting and reporting such state.

Figure 9:
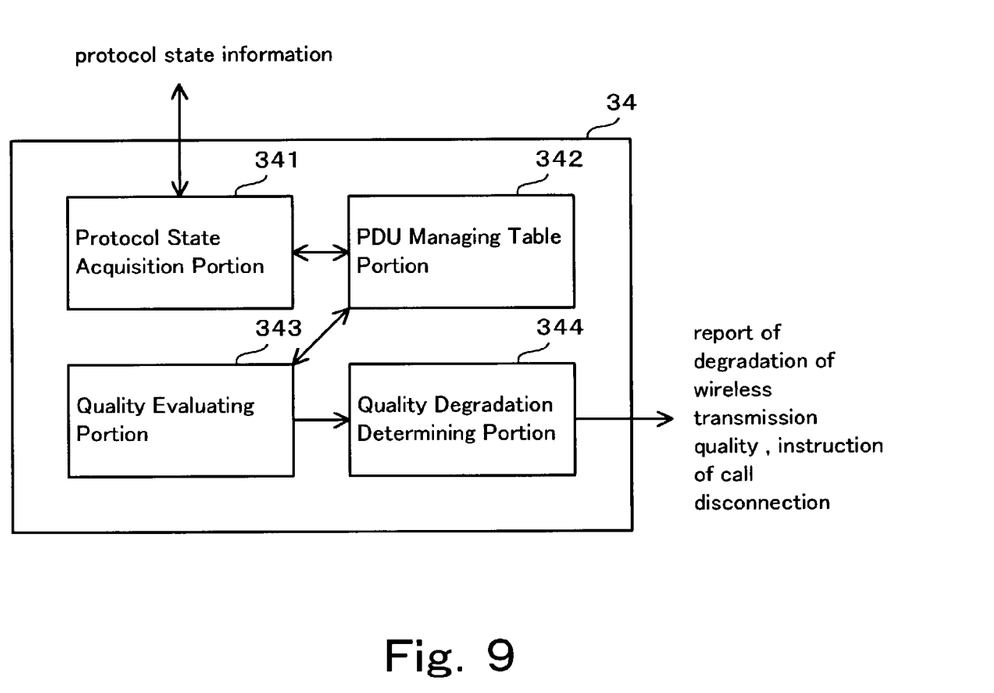
FIG. 9 is a block diagram of a failure detector of a mobile communication system according to a second embodiment of the present invention.

A construction of failure detector 34 of the second embodiment is shown in FIG. 9. Failure detector 34 includes protocol state acquisition portion 341, PDU managing table portion 342, wireless transmission quality evaluating portion 343 and quasi degradation determining portion 344 for determining whether or not the wireless transmission quality is in a quasi degraded state, etc.

Protocol state acquisition portion 341 acquires a protocol state information from protocol terminator 31 as in the first embodiment. PDU managing table portion 342 manages PDU managing table T' in which all calls covered by base station 2 is registered as a unit. PDU managing table T' is stored in a memory provided in failure detector 34 and includes PDU managing table T for each of all calls covered by base station 2. Wireless transmission quality evaluating portion 343 performs a processing for determining whether or not a call is going to be "degraded state" by referring to PDU managing table T in a call unit. Wireless transmission quality quasi degradation determining portion 344 performs a processing for determining whether or not all calls covered by base station 2 as a unit are in the "quasi degraded state" on the basis of a result of determination for respective calls covered by base station 2 and, when the quasi degraded state is detected, reporting it.

Figure 10:
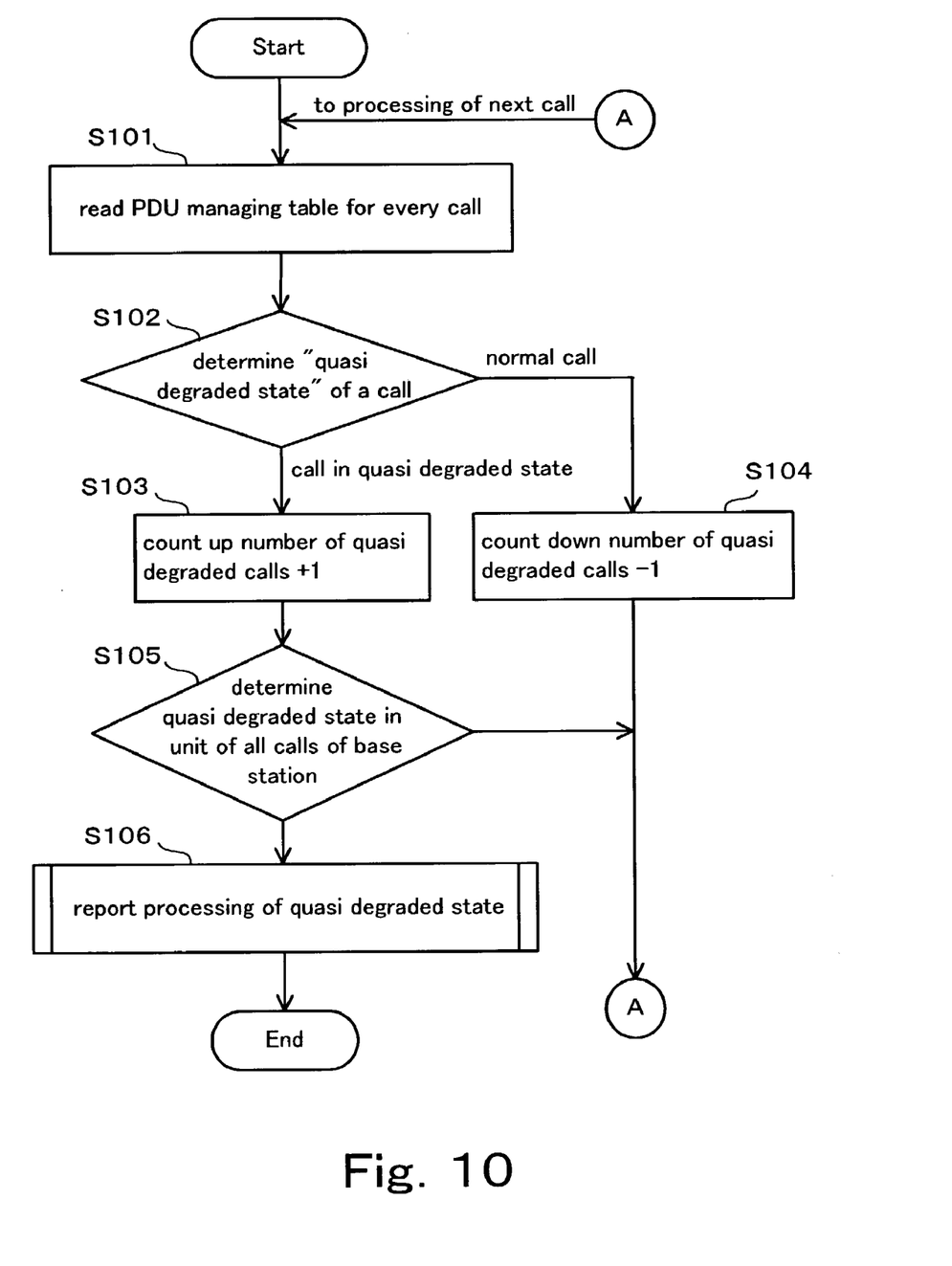
FIG. 10 is a flowchart of an operation for detecting quasi-degradation state of wireless transmission quality in the mobile communication system of the second embodiment.

FIG. 10 is a flowchart of the detection processing of the quasi degraded state of wireless transmission quality in the mobile communication system according to the second embodiment of the present invention. First, in step S101, the total number (e) of re-transmissions of a call is confirmed by reading PDU managing table T of every call.

Then, in step S102, wireless transmission quality evaluating portion 343 compares the total number (e) of re-transmissions of the call with a predetermined threshold value (et) and, when the total number (e) becomes equal to or larger than the threshold value (et), the same call is determined as being in a state where the wireless transmission quality is being degraded, that is, in the "quasi degraded state". And then, a variable "number of quasi degraded calls" (f) is counted up by 1 in step S103. When the total number (e) becomes or is smaller than the threshold value (et), the call is determined as normal and then a processing of a next call is performed after the quasi degraded call number (f) is counted down by 1 in step S104.

Since the "quasi degraded state" is a quality degradation state preceding the "degraded state" in which the call is disconnected, the threshold value (et) of the total number of re-transmission states is set to a value with which the occurrence rate (r) obtained by using the equation (1) or (2) in the first embodiment becomes smaller than the threshold value (rt) of the occurrence rate of re-transmission.

When the "quasi degraded call number" (f) is increased, quasi degraded wireless transmission quality determining portion 344 performs the "quasi degraded state determination" of all of the calls covered by base station 2 as a unit in the step S105. A quasi degraded call rate (h) is obtained according to the following equation:

[quasi degraded call rate (h)]=[number of quasi degraded calls (f)]/[total number of calls of base station (g)]   (3)

The quasi degraded call rate (h) thus obtained is compared with a predetermined threshold value (ht) of quasi degraded call rate. When the quasi degraded call rate (h) is equal to or larger than the threshold value (ht), it is determined that all of the calls covered by the base station are in quasi degraded state and a reporting processing of the "all calls in quasi degraded state" to maintenance terminal 4, etc., in step S106. Thus, the system and maintenance terminal 4 can recognize that the wireless transmission quality in the area covered by the base station (all calls covered by the base station is in the "quasi degraded state", that is, the wireless transmission quality in that area is being degraded totally. Further, there may a processing for sending a suggestion as to possibility of call disconnection to mobile station 1 on the basis of the quasi degraded state report by using a receiving sensitivity information.

Although the present invention has been described with reference to the preferred embodiments, the present invention is not limited thereto and various modifications may be possible within the scope of the present invention.

As will be clear from the foregoing, according to the present invention, it becomes possible, in a mobile communication system in which a processing of an acknowledged mode wireless link control processing protocol is performed, to detect in an early stage a state where a call connection is maintained with throughput of data in an upper layer being lowered on the basis of frequency of the re-transmission control in the protocol when there is a call whose wireless transmission quality is degraded due to steadily occurring re-transmission and to lead to call disconnection and, therefore, the following effects can be obtained.

As a first effect, it is possible to prevent in an early stage an increase of time charge on an end user utilizing a call when a constant amount of data is transmitted therethrough, which is caused by that the service quality of the call is degraded for the previously mentioned reasons and a required communication time or an amount of communication data is increased.

As a second effect, it is possible to provide call connection services with high transmission quality to many mobile stations by effectively utilizing wireless resources by excluding calls limiting the wireless resources (code multiplicity in the CDMA system) by the PDU re-transmission in the wireless transmission section.

What is claimed is:

1. A mobile communication system comprising:
a base station controller for performing an acknowledged mode wireless link control protocol processing with respect to a mobile station, wherein said base station controller:
  monitors a (protocol data unit) transmission state in a wireless link to said mobile station in call unit,
  calculates an occurrence rate of re-transmission as an evaluation value of wireless transmission quality,
  determines that the wireless transmission quality is degraded when the occurrence rate of re-transmission becomes equal to or larger than a predetermined threshold value, and
  performs a disconnection processing for the call,
  wherein said occurrence rate of re-transmission is calculated according to [total number of re-transmission states (number of PDUs of managed PDUs, which are in re-transmission state)]/[total number of the managed PDUs].

2. A mobile communication system as claimed in claim 1, wherein said base station controller comprises:
  protocol terminating means for performing an acknowledged mode wireless link control processing in said wireless link with respect to said mobile station;
  failure detecting means for monitoring the PDU transmission state in said wireless link to said mobile station in call unit, calculating the occurrence rate of re-transmission as the evaluation value of wireless transmission quality, determining that the wireless transmission quality is degraded when the occurrence rate of re-transmission becomes equal to or larger than the predetermined threshold value and reporting it; and
  call control means for performing the call disconnection processing on the basis of the degraded quality determination.

3. A mobile communication system comprising:
  a base station controller for performing an acknowledged mode wireless link control protocol processing with respect to a mobile station,
  wherein said base station controller:
    monitors a (protocol data unit) transmission state in a wireless link to said mobile station in call unit,
    calculates an occurrence rate of re-transmission as an evaluation value of wireless transmission quality,
    determines that the wireless transmission quality is degraded when the occurrence rate of re-transmission becomes equal to or larger than a predetermined threshold value, and
    performs a disconnection processing for the call,
  wherein said occurrence rate of re-transmission is calculated according to [total number of re-transmission states (number of PDUs of managed PDUs, which are in re-transmission state)]/[PDU transmission window size].

4. A mobile communication system as claimed in claim 3, wherein said base station controller comprises:
  protocol terminating means for performing an acknowledged mode wireless link control processing in said wireless link with respect to said mobile station;
  failure detecting means for monitoring the PDU transmission state in said wireless link to said mobile station in call unit, calculating the occurrence rate of re-transmission as the evaluation value of wireless transmission quality, determining that the wireless transmission quality is degraded when the occurrence rate of re-transmission becomes equal to or larger than the predetermined threshold value and reporting it; and
  call control means for performing the call disconnection processing on the basis of the degraded quality determination.

5. A mobile communication system comprising:
  a base station controller for performing an acknowledged mode wireless link control protocol processing with respect to a mobile station,
  wherein said base station controller:
    monitors a (protocol data unit) transmission state in a wireless link to said mobile station in call unit,
    calculates an occurrence rate of re-transmission as an evaluation value of wireless transmission quality,
    determines that the wireless transmission quality is degraded when the occurrence rate of re-transmission becomes equal to or larger than a predetermined threshold value, and
    performs a disconnection processing for the call, a maintenance terminal connected to said base station controller, for setting the threshold value of the occurrence rate of re-transmission and receiving the report of the degraded state of the wireless transmission quality.

6. A mobile communication system as claimed in claim 5, wherein said base station controller comprises:
  protocol terminating means for performing an acknowledged mode wireless link control processing in said wireless link with respect to said mobile station;
  failure detecting means for monitoring the PDU transmission state in said wireless link to said mobile station in call unit, calculating the occurrence rate of re-transmission as the evaluation value of wireless transmission quality, determining that the wireless transmission quality is degraded when the occurrence rate of re-transmission becomes equal to or larger than the predetermined threshold value and reporting it; and
  call control means for performing the call disconnection processing on the basis of the degraded quality determination.

7. A mobile communication system comprising a base station controller for performing an acknowledged mode wireless link control protocol processing with respect to a mobile station, wherein said base station controller monitors a (protocol data unit) transmission state in a wireless link to said mobile station in unit of all calls covered by every base station, calculates a total number of re-transmission states as an evaluation value of wireless transmission quality for every call, determines a degradation of the wireless transmission quality when the total number of re-transmission states becomes equal to or larger than a predetermined threshold value, calculates a call rate of quasi degraded state of all calls covered by said base station, determines a degradation of the wireless transmission quality in unit of all calls when the call rate becomes equal to or larger than a predetermined threshold value and performs a report processing for reporting the quasi degraded state.

8. A mobile communication system as claimed in claim 7, further comprising a maintenance terminal connected to said base station controller, for setting the threshold values and for receiving the report of the quasi degraded state of the wireless transmission quality.

* * * * *